United States Patent [19]
Miller et al.

[11] Patent Number: 5,959,869
[45] Date of Patent: Sep. 28, 1999

[54] VENDING MACHINE CONTROLLER AND SYSTEM

[75] Inventors: John Miller, Fayetteville; Kit Taylor, Stone Mountain; Ira Tolmich, Douglasville, all of Ga.

[73] Assignee: The Coca-Cola Company, Atlanta, Ga.

[21] Appl. No.: 08/758,777

[22] Filed: Dec. 3, 1996

[51] Int. Cl.[6] .......................... G06F 17/00; G06F 151/00
[52] U.S. Cl. .............................. 364/479.01; 222/7; 221/9
[58] Field of Search .............................. 364/479.01, 134, 364/479.14; 222/7; 221/1, 3, 9; 194/206

[56] References Cited

U.S. PATENT DOCUMENTS

| | | | |
|---|---|---|---|
| 4,766,548 | 8/1988 | Cedrone et al. | 364/479.06 |
| 4,947,028 | 8/1990 | Gorog | 235/380 |
| 4,982,346 | 1/1991 | Girouard et al. | 364/578 |
| 5,091,713 | 2/1992 | Horne et al. | 340/541 |
| 5,162,986 | 11/1992 | Graber et al. | 364/146 |
| 5,408,417 | 4/1995 | Wilder | 705/5 |
| 5,442,568 | 8/1995 | Ostendorf et al. | 364/479.06 |
| 5,445,295 | 8/1995 | Brown | 221/3 |
| 5,450,938 | 9/1995 | Rademacher | 194/206 |
| 5,504,675 | 4/1996 | Cragun et al. | 705/14 |
| 5,608,643 | 3/1997 | Wichter et al. | 364/479.14 |
| 5,769,269 | 6/1998 | Peters | 221/7 |

*Primary Examiner*—Albert DeCady
*Assistant Examiner*—Shelly A Chase
*Attorney, Agent, or Firm*—Birch, Stewart, Kolasch & Birch, LLP

[57] ABSTRACT

A vending machine controller having a single serial port on the same chip as the programmable processor. The controller includes a port arbitrator that selectively connects one of several serially communicating devices to this single serial port. The vending machine controller also has multitasking capabilities so that remote price changing, and/or remote reprogramming can be conducted at the same time as a vend operation and/or a multimedia presentation.

33 Claims, 3 Drawing Sheets

VENDING MACHINE CONTROLLER AND SYSTEM

FIELD OF THE INVENTION

The present invention is directed toward a controller for a vending machine, and a vending machine including such a controller.

BACKGROUND OF THE INVENTION

Processor-based prior art vending machine controllers (VMCs) typically have been implemented using a low cost, embedded controller, e.g., the Intel brand model 8051. Such a controller separately performs many vending machine control operations, including monitoring, storing, and periodically reporting data pertinent to the operation of the vending machine, e.g., sales and inventory information.

The Cedrone patent (U.S. Pat. No. 4,776,548) discloses a system for monitoring a vending machine and periodically transmitting information relating to machine conditions, sales and product inventory to a central computer.

The Girouard patent (U.S. Pat. No. 4,982,346) discloses an automated system for point-of-sale-type advertising and promotional campaigns, having a computer which can display advertisements on a monitor, manage promotional sweepstakes, display product or store locator maps, dispense coupons, accept orders, manage customer surveys, and communicate with a remote host computer.

The Gorog patent (U.S. Pat. No. 4,947,028) discloses a vending machine that can accept voice commands via a voice recognition system (and communicate with the customer via a voice synthesizer) to accommodate those persons who are unable to perform manual data entry tasks. In addition, the Gorog patent discloses a vending machine that can remotely verify a customer's credit worthiness prior to permitting a sale on credit to the customer.

The Horne patent (U.S. Pat. No. 5,091,713) discloses a vending machine that incorporates a modem 11, a credit card reader 40, a display panel 50, a printer 70 and a speaker 80. The display panel and/or the speaker can be used to present messages and advertising, and the printer can be used to prepare coupons, promotional information, rebate slips and the like.

The Wilder patent (U.S. Pat. No. 5,408,417) discloses a vending machine incorporating a touch screen display panel 11, aural prompts in a plurality of languages, and the ability to accommodate a plurality of payment methods.

The Ostendorf patent (U.S. Pat. No. 5,442,568) discloses an audit/monitoring system for use with a plurality of automated vending machines.

The Brown patent (U.S. Pat. 5,445,295) discloses an automated vending machine that is remotely controlled by a host computer, that can permit a customer to sample the audio/video merchandise, but which has only a single external serial port for external communication.

The Rademacher patent (U.S. Pat. No. 5,450,938) discloses a group of vending machines that interface with a common controller incorporating a money-handling/accrediting device. The money-handling/accrediting device has a reader for encoded cards as well as a coin acceptor, and issues a bonus, or premium, to patrons using encoded cards.

The Cragun patent (U.S. Pat. No. 5,504,675) discloses a neural-network-based vending kiosk that adaptively selects presentation-programs based upon feedback from customers. The feedback represents the relative success of the currently running presentation-programs and is used to select subsequent presentation-programs that are most likely to please the customers present at the kiosk at that moment.

The operating systems of such prior art controllers can be configured to perform the many vending machine functions in a timesharing fashion, though the processor of the VMC operates so slowly that the timesharing is noticed by the parties that are sharing the microprocessor's time, i.e, the timesharing is not transparent.

A practical consequence is that, while a customer conducts a vending operation, the VMC cannot simultaneously provide the sales/inventory information to a remote host over the modem. For the remote host, this becomes problematic because usually there are a great many vending machines from which marketing information must be retrieved. A remote host can expend a great deal of time waiting for VMCs to connect and provide sales/inventory information.

A similar practical consequence is that, if the VMC connects to the remote host and attempts to provide the sales/inventory information over the modem, and if a customer attempts to initiate a vending operation, either the VMC must terminate the connection to the remote host in favor of the vending operation, or the VMC must complete the communication session with the remote host before attending to the vending operation. The latter circumstance might annoy a customer to the point that the customer would retaliate by purchasing a product from an adjacent vending machine or other vendor rather than waiting for the busy vending machine to become available. Alternatively, if a prior art VMC could provide a multimedia marketing program to attract customer attention, and if a customer initiates a product purchase during the multimedia program, then either the multimedia program is abruptly and awkwardly interrupted or the customer has to wait for the multimedia program to finish before the vending operation can proceed.

Some prior art vending machine controllers provide two serial ports, one for a modem to connect to a remote host and one for a local connection, via a cable or by an infrared light link, to a hand-held computer wielded by a person servicing the vending machine, e.g., restocking it. The prior art provides these two serial ports either by manufacturing a custom integrated circuit (IC) having two serial ports integrated on the same silicon chip as the processor or by using two universal asynchronous receiver/transmitter (UART) devices connected to the data bus of the processor.

Using a custom IC is very expensive. In the vending machine industry, the cost of the vending machine controller is approximately 10% of the cost of the vending machine. As such, a controller for a vending machine is an especially price-sensitive component of the vending machine. Consequently, the use of a custom IC is impractical. Similarly, the use of two UART devices imposes additional expense, although not as great as the use of a custom IC.

In the alternative, if the costs associated with two dedicated serial connections could not be tolerated, the prior art is content to require a service person to physically disconnect the modem for the remote host when the service person desired to connect a hand-held computer to the vending machine controller. Having to break and make physical connections is inconvenient for the service person and potentially damaging for the vending machine.

Thus, there is a need in the prior art for a vending machine controller that provides the equivalent performance to two serial ports built on the same silicon chip as the processor without imposing the cost of a custom integrated circuit upon the vending machine controller. In addition, there is a need in the prior art for a vending machine controller that can transparently multi-task, e.g., conduct the transfer of sales information to a remote host over a modem at the same time that it vends a product to a customer.

Non-analogous prior art includes a switching device for connecting multiple personal computers (PCs) to a single printer. The device recognizes when a PC sends a print job, via a parallel connection rather than serial, to the printer and connects the printer to the sending PC for a predetermined amount of time that is sufficient for the print job to be received by the printer, after which the switching device releases the line connecting the PC and the printer. In other words, the connection is terminated on a time-out basis rather than under the control of the receiving device, i.e., the printer.

SUMMARY OF THE INVENTION

It is an object of the present invention to provide a new vending machine, or to revitalize a prior art vending machine by retrofitting, with such a controller that satisfies the needs of the prior art as discussed above.

It is an object of the present invention to provide a vending machine controller that provides substantially equivalent performance to a controller employing a custom processor having two or more serial ports formed on the same silicon chip as the processor without incurring the cost of such a custom IC.

It is an object of the present invention to provide a vending machine controller that provides substantially equivalent performance to a controller employing two or more UART devices connected to the data bus of the processor without incurring the additional costs associated with the two or more UART devices.

It is an object of the present invention to provide a vending machine controller that can provide a multimedia presentation to a customer as one of its multi-tasked functions.

It is an object of the present invention to provide a vending machine controller that can communicate sales/inventory to an external host, e.g., a remote host via modem, as one of its multi-tasked vending machine functions. Communication of such sales/inventory data promotes accurate and timely restocking of vending machine inventory, thereby increasing consumer satisfaction by reducing or eliminating sold-out products.

It is an object of the present invention to provide a vending machine controller that can support remote price changing, i.e., a controller that can have its vended product prices changed by a remote host, preferably as one of its multi-tasked vending machine functions.

It is an object of the present invention to provide a vending machine controller that can support remote changes to a promotional campaign, i.e., a controller that can have a promotional campaign, e.g., "buy two, get one free" changed to "buy one, get one free," changed by a remote host, preferably as one of its multi-tasked vending machine functions.

It is an object of the present invention to provide a vending machine controller that supports remote reprogramming, i.e., whole or partial reprogramming of the basic operating system of the processor by way of a remote host replacing all or some of the contents of a flash EEPROM.

These and other objects of the invention are fulfilled by providing a vending machine controller comprising: a programmable processor controlling operation of the vending machine; a first serial port connected to the programmable processor; an arbitrator operable in a hunt mode to monitor an input from each of at least a first and second serially-communicating device, respectively, to determine that a communication session is being initiated by one of the serially-communicating devices if activity is present upon an input, and to connect the first serial port of the programmable processor to the serially-communicating device that first initiates a communication session; and a second serial port configured as one of a multi-drop bus interface and a Vendor Control COCA-COLA System bus interface for connecting the programmable processor to a multi-drop bus or a VCCS bus, respectively.

These and other objects of the invention are also fulfilled by providing a vending machine system comprising: at least a first serially-communicating device and a second serially-communicating device; a programmable processor controlling operation of the vending machine; a first serial port connected to the programmable processor; an arbitrator operable in a hunt mode to monitor an input from each of at least a first and second serially-communicating device, respectively, to determine that a communication session is being initiated by one of the serially-communicating devices if activity is present upon an input, and to connect the first serial port of the programmable processor to the serially-communicating device that first initiates a communication session; and a second serial port configured as one of a multi-drop bus interface and a VCCS bus interface for connecting the programmable processor to a multi-drop bus or a VCCS bus, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
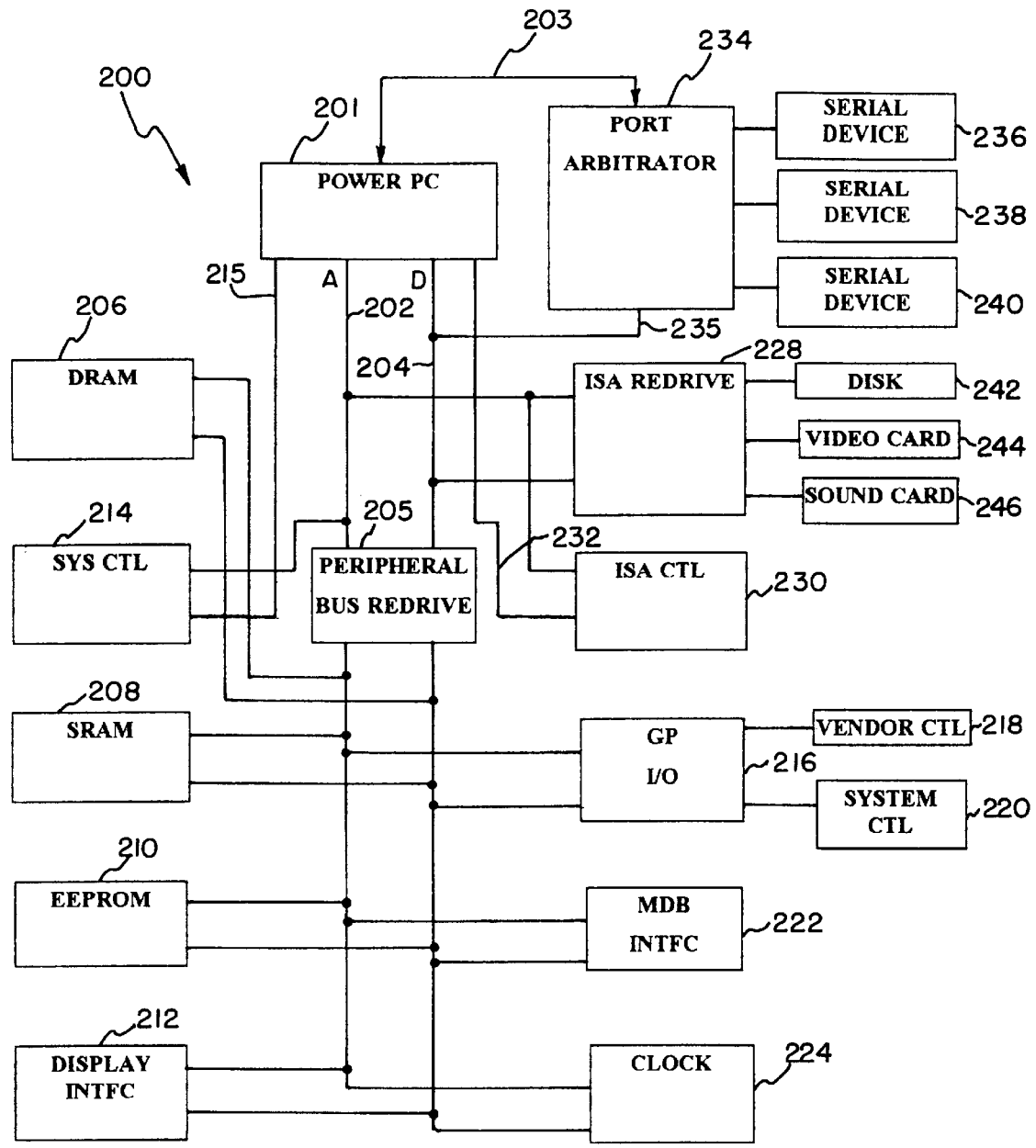
FIG. 1 is a block diagram depiction of an embodiment of the vending machine controller of the present invention.

FIG. 1 is a block diagram depiction of an embodiment of the vending machine controller of the present invention.

Item 200 of FIG. 1 is an embodiment of the vending machine controller of the present application. The vending machine controller 200 includes: a programmable processor 201 having a serial port (not shown), an address bus 202 and a data bus 204 connected to the programmable processor 201. A peripheral bus redrive device 205 is connected to the address bus 202 and the data bus 204. Also connected to the address bus 202 and the data bus 204 are: dynamic random access memory (DRAM) circuitry 206; static random access memory (SRAM) circuits 208; a flash electrically erasable programmable read-only memory (EEPROM) 210; a display interface 212; a system control circuit 214; a general purpose input/output (I/O) interface 216; a multi-drop bus (MDB) interface 222; a clock 224; and an ISA redrive circuit 228. The MDB 222 conforms to the "International Multi-Drop Bus Interface Standard", established by the National Automatic Merchandizing Association (NAMA), of Chicago, Ill.

An ISA controller 230 is connected to the data bus 204 and is also directly connected to the program processor 201 over the lines 232 conveying control signals. A disk device 242, e.g., a compact disc read only memory (CDROM) or a hard disk drive, a video card 244 for driving a video monitor meeting the video graphics adapter (VGA) standard, and a sound reproduction card 246 are connected to the ISA redrive circuit 228. Alternatively, and preferably, the sound reproduction card 246 is replaced by an MPEG (Motion Picture Expert Group) hardware decoder that not only decodes and makes available video information, both still and moving, stored on the disk device 242, but also sound information.

The general purpose I/O circuit 216 is connected over plural lines to vending machine control circuitry 218 and to vending machine control system circuitry 220. The vending machine control circuitry 218, e.g., includes vend mechanisms by which a selected product is released from the inventory columns. The vending machine control system circuitry 220 controls, e.g., panel push-buttons on the front of the vending machine and/or status indicators such as "sold out" or "correct change" illuminated signs.

FIG. 1 also depicts a port arbitrator 234 connected to the serial port (not shown) of the programmable processor 201 by a signal path 203. Each of three serially-communicating devices 236, 238 and 240 is connected to the port arbitrator over plural lines, respectively. Examples of such serial devices include: a modem for communicating with a host computer over, e.g., a phone line, a cellular network (using a cellular network data specification such as CDPD or Cellemetry); a network communication card for communicating on commercial data networks such as RAM, ARDIS, etc.; another vending machine controller board; and a portable data collection device such as a handheld computer connected by a cable or by an infrared light link and which uses the Direct Exchange/Uniform Communications Standard (DEX/UCS) protocol established by the Uniform Code Council of Dayton, Ohio, or DDCMP (Digital Equipment Corporation (DEC) Data Communications Message Protocol, Document No. AA-599A-TC, DEC Software Distribution Center, Maynard, Mass.), respectively. Several companies manufacture such portable data collection devices, including: NORAND Corporation of Cedar Rapids, Iowa, e.g., model no. 4400 in the Series 4000 family; Audit Systems Company of Timonium, Md., e.g., model Pocket-probe; Trigon International Corporation, e.g., model no. TR-G; Telxon Company; Psion Company; Skyware Company; and Harvest Company. Data transferred should be in a format compatible with the Vending Industry Data Transfer Standard established by NAMA.

Figure 2:
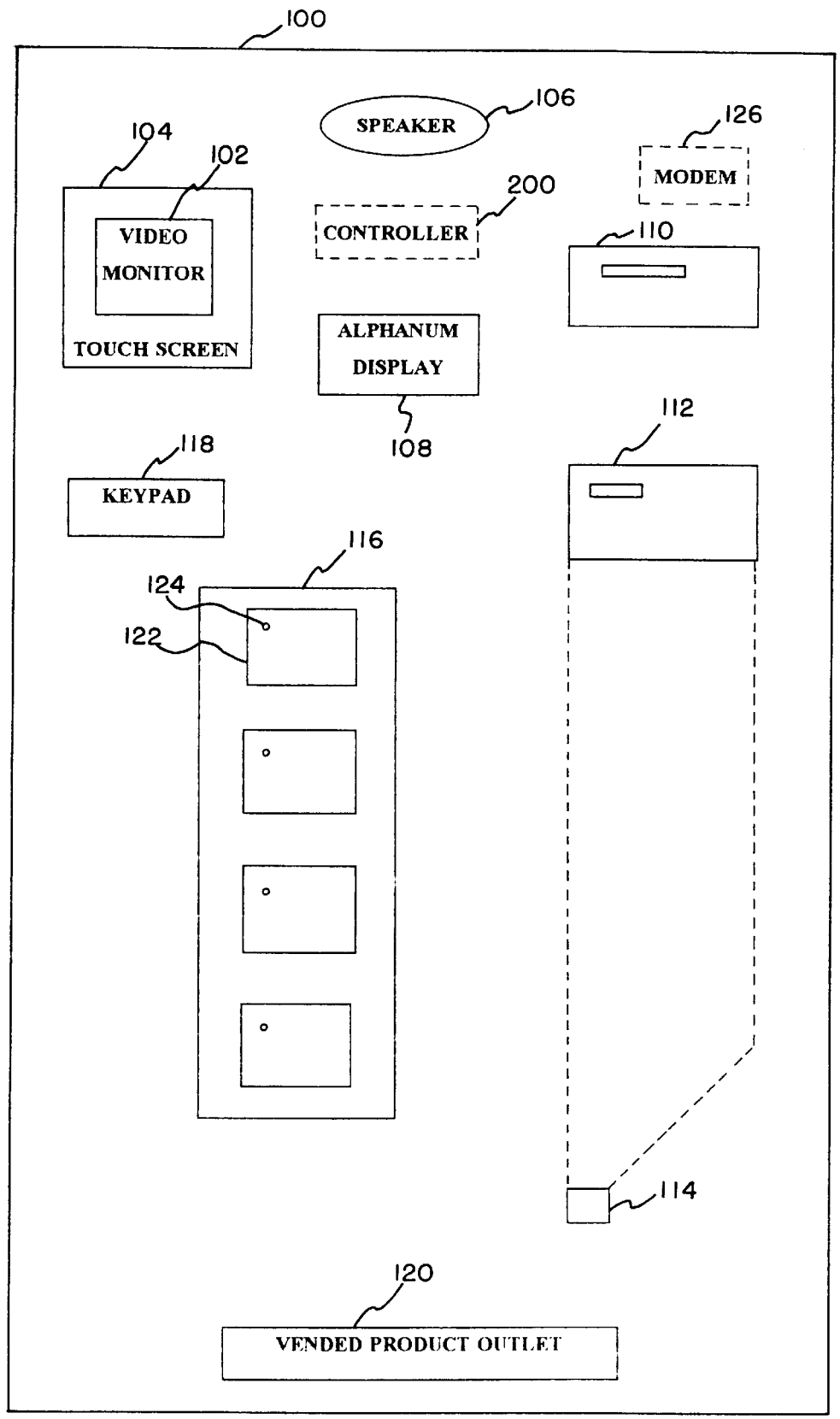
FIG. 2 is a depiction of a vending machine embodiment of the present invention.

FIG. 2 depicts a frontal view of a vending machine incorporating the controller of the present application. The vending machine 100 of FIG. 2 includes: a video monitor 102 of a quality level at least equal to the video graphics adaptor (VGA) standard, although it could alternatively be a relatively low resolution LCD panel; a touch screen device 104 overlying the video monitor 102; a loud speaker system 106; an alpha-numeric display device 108, e.g., a liquid crystal display (LCD) panel or a light emitting diode (LED) display panel; a bill validation device 110; a combined coin validation and change dispensing device 112 including coin tubes (not shown) and an escrow outlet 114; a vended-product selection, man/vending-machine interaction panel 116 including user-actuatable switches 122 having a product availability indicator 124, e.g., a light emitting diode (LED); a keypad 118; a vended product output 120; a modem 126; and the controller 200.

It is noted that the operative interconnections between the devices in the vending machine 100 have not been depicted for the purpose of simplifying FIG. 2. The list of devices included in the vending machine 100 is not intended to be exhaustive. Rather, the vending machine 100 can include other well known vending machine devices.

Figure 3:
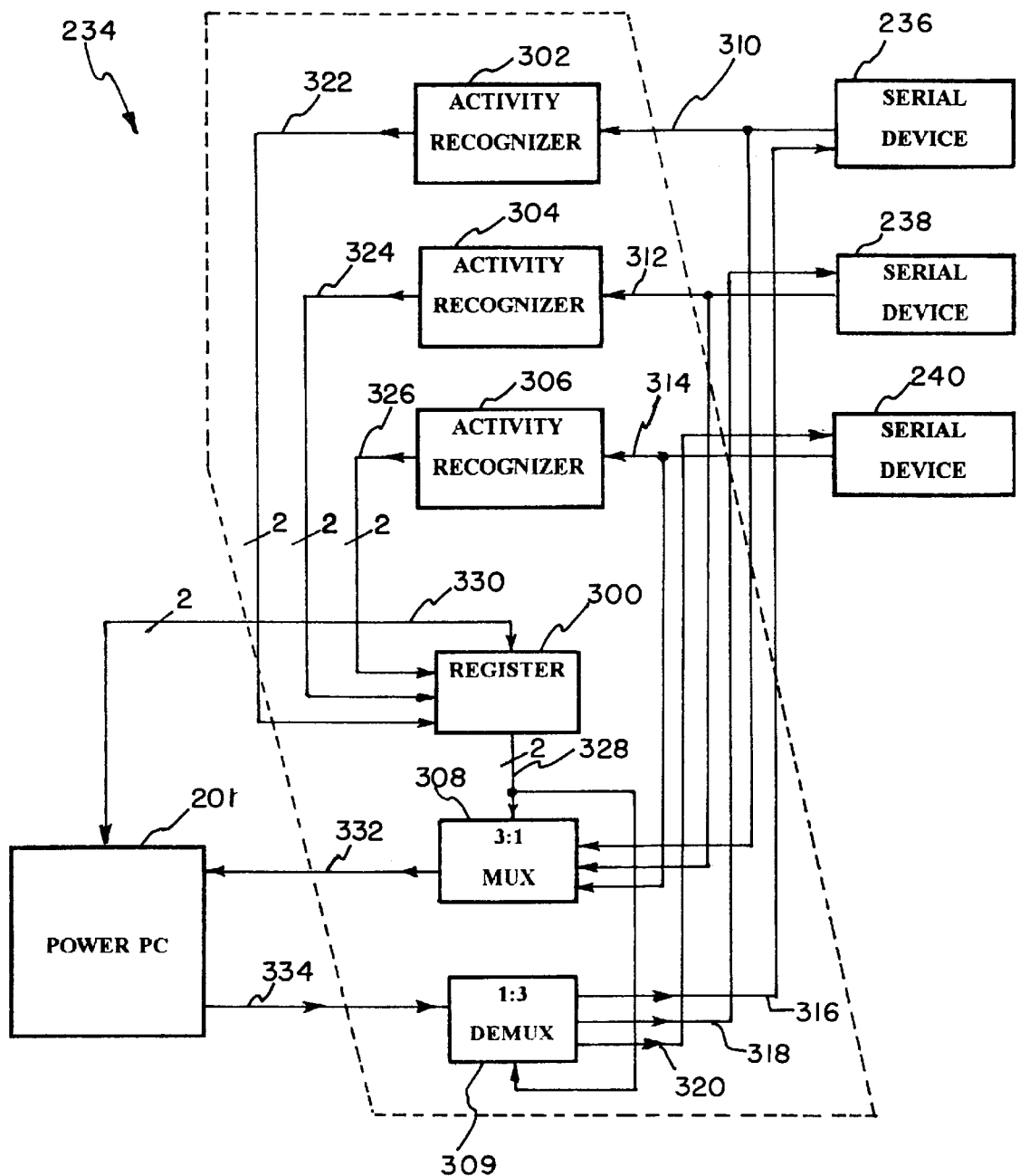
FIG. 3 is a more detailed block diagram depiction of the port arbitrator of the present invention.

FIG. 3 is a more detailed block diagram depiction of the port arbitrator 234 and its connections to the serial devices 236, 238 and 240, and the programmable processor 200. The port arbitrator 234 is preferably implemented in the form of a programmable logic array which provides the logical equivalent to the structures depicted in FIG. 3. The arbitrator 234 includes three activity recognizers 302, 304 and 306. The number of activity recognizers depends upon the number of serial devices that are to be selectively connected to the serial port (not shown) formed on the same silicon chip as the programmable processor 201. The arbitrator 234 also includes a connection control register 300, a three:one multiplexer (MUX) 308, and a 1:3 demultiplexer (DEMUX) 309.

The serial device 236 transmits data over the line 310 to the activity recognizer 302 and the MUX 308. Similarly, the serial device 238 transmits over the line 312 to the activity recognizer 304 and to the MUX 308, and the serial device 240 transmits over the line 314 to the activity recognizer 306 and to the MUX 308. The MUX 308 connects one of the data lines 310, 312, and 314 to the receive or data line 332 going to the serial port (not shown) programmable processor <201.

The programmable processor 201 transmits over the transmit or data line 334 by way of the serial port (not shown). The DEMUX 309 connects the data line 334 to the serial device 236 via the data line 316, to the serial device 238 via the data line 318, and to the serial device 240 via the data line 320.

Each of the activity recognizers 302, 304, and 306 writes a numerical value into the register 300 over the two-byte lines 322, 324 and 326, respectively. The programmable processor 201 can write a numerical to the register 300, and read the value therein over the two-byte line 330. The register 300 conveys the numerical value stored therein to the MUX 308 and the DEMUX 309 over the two-byte line 328.

Referring again to FIG. 1, the programmable processor 201 is preferably a Power PC type processor, model 403GA, available from the International Business Machines (IBM) Corporation. This is a reduced instruction set computing (RISC) processor having a single serial port formed on the same silicon chip as the processor per se. The flash EEPROM is preferably 512K bytes in size. The SRAM 208 is preferably 128K bytes in size. The general purpose I/O 216 preferably has 16 general purpose latched outputs and 16 general purpose sample inputs. These 16 outputs and the 16 inputs are connected to a card with the high voltage buffers for the vending machine, e.g., the front panel of the vending machine including the man-vending-machine interaction panel 116, the key pad 118, the alpha-numeric display 108, the bill validator 110 and the combined coin validation and change device 112.

The DRAM circuitry 206 is optional and can be up to 32 megabytes in size, as needed. The ISA redrive circuit 228 can enable up to about 10 ISA-type circuit cards to be connected to the address bus 202 and the data bus 204. The exact number of ISA-type cards depends upon the total power consumption of the boards involved. The ISA controller circuit 230 generates all of the control and timing circuits necessary to interface the ISA bus of the ISA redrive circuit 228 to the address bus 202 and the data bus 204.

Referring again to FIG. 3, the port arbitrator 234 operates as follows. The numerical value in the register 300 controls which of lines 310, 312 and 314 are selected by the MUX 308 and also controls which of lines 316, 318 and 320 are selected by the DEMUX 309. Thus, the programmable processor 201 can set the value in the numerical register so that it can send data via the DEMUX 309 to any one of the serial devices 236, 238 and 240. Preferably, the programmable processor 201 writes to the connection control register 300 using two of the lines in the data bus 204, shown as a connection 235 in FIG. 3. Alternatively, two of the lines of the address bus 202 could be used, or dedicated lines can be provided.

When the programmable processor 201 sets the value in the numerical register, this is known as operating in the fixed mode. For example, if the programmable processor 201 stores the binary value 01 into the connection control register 300, then the DEMUX 309 will connect the line 334 to the line 316. Similarly, setting a binary value 10 in the register 300 causes the line 334 to be connected to the line 318, and setting a binary value of 11 in the register causes the line 334 to be connected to the line 320.

If, however, the programmable processor 201 stores the binary value 00 in the register 300, then none of the lines 310, 312 and 314 are connected to the line 332 respectively, and none of the lines 316, 318 and 320 are connected to the line 334 respectively. This is known as operating in the hunt mode.

Each of the activity recognizers 302, 304 and 306 senses activity on the line, i.e., whether communication is being initiated by the serial devices 236, 238, and 240, respectively. Activity, e.g., is the high-to-low transition indicating a start byte according to the RS-232 standard.

Again, the structures comprising the port arbitrator 234 are preferably implemented using a programmable logic array. The equations given below represent the operation of the arbitrator 234 as embodied in the programmable logic array. The equations are written in a language ABEL, a commercially available programmable language. For example, the Lattice Semiconductor Corporation of Oregon sells an ABEL language compiler.

In the language, ABEL, the symbol ! represents a logical complement or inversion operation, the symbol & represents a logical AND operation, the symbol # represents a logical .OR. operation, and the symbol == represents a logical test for equality. For example, X==1 would mean "Is X equal to 1?," and would return a value of zero for no/false or one for yes/true.

The operation of the activity recognizers 302, 304, and 306 is represented by the logical equations 1–2.

EQUATION No. 1

$$
\begin{aligned}
IO1.D = RESET \ \& \ ( \\
( \ IO1 \ \& \ !(!ARB\_CS \ \& \ !IO\_RW) \ ) \\
\# \\
( \ (!P2\_RD \ \# \ !P3\_RD) \ \& \ (IO==0) \ ) \\
\# \\
( \ !ARB\_CS \ \& \ !IO\_RW \ \& \ D10) \\
)
\end{aligned}
$$

The variable IO1.D represents the binary input to the first bit of the two-bit connection control register 300 that will be stored in the connection control register 300 as soon as it receives the next system clock signal (not shown). The variable RESET represents the signal on the reset pin of the programmable logic array implementing the arbitrator 234, normally is in a high logical state, and drops to a low logical state to reset. The variable IO1 represents the current binary value of the first bit of the two-bit connection control register 300. The variable ARB_CS represents the arbitrator chip select signal (not shown) going to the arbitrator 234, and assumes a logical zero value when the arbitrator 234 has been selected. The variable IO_RW represents the read/write signal (not shown) going to the arbitrator 234 from the programmable processor 201, and assumes a logical zero value during write operations.

The variables P2_RD and P3_RD represent the data being received from the second and third serially communicating devices 238 and 240 over the lines 312 and 314, respectively, i.e., two of the inputs to the MUX 308. The variable IO represents the decimal equivalent of the binary number currently stored in the connection control register 300. The variable D10 represents the data on the D10 line of the data bus.

EQUATION No. 2

$$
\begin{aligned}
IO2.D = RESET \ \& \ ( \\
( \ IO2 \ \& \ !(!ARB\_CS \ \& \ !IO\_RW) \ ) \\
\# \\
( \ (!P1\_RD \ \# \ !P3\_RD) \ \& \ (IO==0) \ ) \\
\# \\
( \ !ARB\_CS \ \& \ !IO\_RW \ \& \ D11) \\
)
\end{aligned}
$$

The variable IO2.D represents the binary input to the second bit of the two-bit connection control register 300 that will be stored in it as the second bit as soon as it receives the next system clock signal (not shown). The variable IO2 represents the current binary value of the second bit of the two-bit connection control register 300. The variable D11 represents the data on the D11 line of the data bus.

In Equations 1–2, the bits in the connection control register can take a high logical state when the reset is not low. If the value in the connection control register 300 neither corresponds to a read or write state, then maintain this state, i.e., IO=0. If in the hunt mode, i.e., IO==0, then change the value in the connection control register upon receipt of data from one of the serially communicating devices. If the CPU is writing, i.e., IO==1 or IO==2 or IO==3, then save the value of D10 and D11 as the two bits in the connection control register 300, respectively.

As alluded to above, the variables D10 and D11 could be replaced by the variables A10 and A11, which represent the signal on the A10 and A11 lines of the address bus. Alternatively, another other data lines or address lines could be used, or a combination of a data line and an address line.

The connection control register 300 is enabled to output data onto the data bus 204 according to Equations 3–4, respectively.

$$IO1.OE = !ARB\_CS \ \& \ IO\_RW \quad \text{EQUATION No. 3}$$

$$IO2.OE = !ARB\_CS \ \& \ IO\_RW \quad \text{EQUATION No. 4}$$

The variables IO1.OE and IO2.OE represent output enable signals (not shown) that get applied to the connection control register by the programmable processor 201 to enable output of the connection control register 300 to the data bus 204.

The operation of the MUX 308 is represented by the combinatorial logical equation 5.

$$\text{EQUATION No. 5}$$
$$RD\_OUT = (\\
(P1\_RD \ \& \ (IO==1)) \\
\# \\
(P2\_RD \ \& \ (IO==2)) \\
\# \\
(P3\_RD \ \& \ (IO==3)) \\
)$$

The variable RD_OUT represents the data on the line 332 from the MUX 308. If a serially communicating device is identified by the two-bit number in the connection control register 300, then the line from that serially communicating device is connected by the MUX 308 to the line 332.

The operation of the DEMUX 309 is represented by the combinatorial logical equations 6–8.

$$P1\_TD = (TD\_IN \ \& \ (IO==1)) \ \# \ (IO!=1) \quad \text{EQUATION No. 6}$$

$$P2\_TD = (TD\_IN \ \& \ (IO==2)) \ \# \ (IO!=2) \quad \text{EQUATION No. 7}$$

$$P3\_TD = (TD\_IN \ \& \ (IO==3)) \ \# \ (IO!=3) \quad \text{EQUATION No. 8}$$

In Equations 6–8, the variables P1_TD, P2_TD, and P2_TD represent the data on the lines 316, 318, and 320 from the DEMUX 309 to the serially communicating devices 236, 238, and 240, respectively. For example, if IO=3, then the programmable processor 201 is conducting a communication session with the third serially communicating device 240; consequently, (IO!==1)=1, which makes P1_TD=1, where 1 is the idle state under the RS-232 communication standard.

Upon sensing activity on a data line from the serial device, an activity recognizer sets a numerical value in the register 300 corresponding to its identity. For example, the activity recognizer 302 would set a binary value of 01 in the register 300, which would cause the MUX 308 to connect the line 310 to the line 332. The programmable processor 201 prevents the value in the register 300 from being changed until the communication session with the serial device 236 has terminated. When the communication session is over, the programmable processor 201 causes the MUX 308 and the DEMUX 309 to deselect the lines 310, 312, 314, 316, 318, and 320, respectively by writing the binary value, e.g., 00, to the connection control register 300.

If, for example, the serial device 236 begins to send data and no other communication session is currently in process, then the activity recognizer 302 will write its identity number into the register 300 thereby causing the MUX 308 to connect the line 310 to the line 332, i.e., changing to fixed mode from hunt mode. Subsequently during that communication session, if the serial device 238 attempts to initiate a communication session by sending data, the MUX 308 will not permit the data on the line 312 to be connected to the line 332 because the binary value 01 is stored in the connection control register 300. The serial device 238 would have to retry until the programmable processor 201 has reentered the hunt mode by writing the value 00 to the connection control register 300 thereby causing the MUX 208 to deselect the lines 310, 312, and 314.

Similarly, if the programmable processor 201 is operating in the fixed mode (discussed above) by which it selects a serial device for a communication session, then none of the activity recognizers 302, 304 and 306 can write its identity number into the register 300 until the communication session initiated by the programmable processor 201 has been terminated by the programmable processor 201 and the lines 316, 318, 320 (as well as the lines 310, 312, and 314) have been deselected by reentering the hunt mode.

The programmable processor 201 can support a multimedia presentation at the same time that it conducts, e.g., a vending operation with a customer and/or telecommunication to a host. If the vending machine is optionally configured to provide multimedia presentations, then at least the disk device (CD ROM or hard disk) 242, the at least a VGA-quality display card 244, the DRAM circuitry 206, and the sound reproduction 246 will be connected to the ISA redrive circuit 228.

The programmable processor uses a preemptive time-sharing operating system to achieve multitasking. An example of such an operating system for the Power PC 403GA processor is OS-Open, available from IBM. This combination of processor and operating system makes it possible for the vending machine controller of the present invention to conduct a vending operation at the same time as a telecommunication operation with a host and/or a multimedia presentation without the customer and the host being aware that the processing resources of the controller are being shared.

All programmed aspects of the programmable processor 201 can be reprogrammed remotely. For example, the prices charged for vended products, the scheduling of marketing messages (e.g., concerning special promotional events) to be displayed by the vending machine, and/or the operating system of the programmable processor can be reprogrammed either by a remote host connected by modem to the serial port of the processor through the port arbitrator 234 or by a local hand-held computer wielded by a service person connected by a cable or an infrared light link to the programmable processor 201 via the port arbitrator 234.

As an example of such reprogramming, a change in operating systems will be discussed. The remote hosts connects to the programmable processor 201 via the port arbitrator 234. The remote host causes the processor 201 to read the operating system out of the flash EEPROM 210 into the DRAM 206. The remote host then transmits the new operating system to the programmable processor 201 which stores it in the DRAM 206, as well. The programmable processor 201 and the remote host then verify that the new operating system has been received without being corrupted. Then, the programmable processor, still running under the control of the old operating system in the DRAM 206, writes the new operating system into the flash EEPROM 210. Subsequently, the programmable processor 201 is either rebooted or execution of the operating system is switched over to the new operating system in the flash EEPROM 210 at a particular location in the program stored therein.

To rephrase, the vending machine controller (VMC) can update software, i.e., machine level operational software as opposed to user programmable data, remotely and/or locally. In addition, user programmable data such as product prices can be changed remotely, and/or locally.

The VMC is the master of at least two bus systems, and optionally a third bus system. The first bus system is the data bus 204 and address bus 202 to which the programmable processor 201 is directly connected. The second bus is the multidrop bus (MDB) that is the standard bus of vending machines in the United States and much of the rest of the world. In the alternative, the MBD can be replaced with the Vendor Control Coca-Cola System (VCCS) standard bus used in Japan. The VCCS and MDB buses are functionally similar in that they provide for communication with, and control of, vending machine peripherals, e.g., coin mechanisms, credit card readers, and bill validators. The third, and optional, bus is the ISA bus represented by the ISA redrive circuit 228.

As master of the buses, the VMC polls each peripheral, transmits commands to peripherals, and receives information from each peripheral that is necessary to control the vending process. In addition, the VMC monitors and controls other non-peripherals inputs, via the GP I/O 216 such as the vending mechanisms, selection switches, door switches, service mode switches, alpha numeric display (via the display interface 212) and the port arbitrator 234. The VMC is responsible for credit accumulation, a minimum payout algorithm, data collection and telecommunication, consumer display control, vend device control, and input device monitoring functions required to process a vend operation.

The VMC is responsible for managing consumption of the power supply budget by the buses and the peripherals. It must disable peripherals, as appropriate, during high power consumption operations by the VMC and other peripherals.

The VMC stores at least one vend price for each product available for sale including special promotional pricing on predetermined products, product-storage-column to selection-switch assignments (space-to-sales) and machine configuration switch status.

The VMC prevents multiple product delivery or loss of credit due to consumers simultaneously actuating selection buttons in the escrow (coin return) lever, or other mischievous acts.

The VMC operates, e.g., in three separate modes: the sale mode, the service mode, and the communication mode. The sales mode is the default mode of operation. In the sales mode, the VMC monitors and evaluates the status of the peripheral and the non-peripheral inputs and the stored information waiting to establish credit. Peripheral inputs can be from, e.g., a coin acceptor/dispenser mechanism, a bill validator, a credit card reader, or a vend-mechanism-slave-controller such as a small microprocessor interfacing between the VMC and the actual vending mechanisms. Non-peripheral inputs can be from, e.g., selection buttons, status indicators, a door switch, or sold-out switches arranged to monitor inventory columns/queues.

When the accumulating credit reaches a value equal to or greater than the lowest vend price, the activation of a selection switch, e.g., 122 or the key pad 118 initiates a vend from the appropriate column/queue (not shown) of product inventory. If the accumulating credit exceeds the vend price, the VMC issues command to a credit return device, e.g, 112, to return an appropriate amount of change. During this process all appropriate data collection storage registers are updated to reflect the results of the transaction.

Price changing, control parameter alteration, data collection and error diagnosis routines can be carried out by a local service person communicating with the VMC through, e.g., four user-actuatable switches. The following exemplary responses to prompts from the programmable processor can be provided by the service person using these switches: an escape or cancel command with the first switch; an increase or next command with the second switch; a decrease or previous command with the third switch; and an enter or O.K. or accept command with the fourth switch. Given the telecommunications ability of the VMC 200, it is preferable that a service person could remotely carry out these routines. Alternatively, a service person could carry out those routines locally without using the four user-actuatable switches, or a remote host computer could automatically carry out these service routines.

Each of the prior art patents on the following list hereby is incorporated by reference in its entirety: U.S. Pat. No. 4,766,548, entitled "TELELINK MONITORING AND REPORTING SYSTEM", to Cedrone et al., filed Jan. 2, 1987; U.S. Pat. No. 5,442,568, entitled "VENDING MACHINE AUDIT MONITORING SYSTEM", to Ostendorf et al., filed Nov. 15, 1994; U.S. Pat. No. 5,091,713, entitled "INVENTORY, CASH, SECURITY, AND MAINTENANCE CONTROL APPARATUS AND METHOD FOR A PLURALITY OF REMOTE VENDING MACHINES", to Horne et al., filed May 10, 1990; U.S. Pat. No. 5,445,295, entitled "AUTOMATED VENDING MACHINE SYSTEM FOR RECORDED GOODS", to Brown, filed Jan. 17, 1992; U.S. Pat. No. 5,408,417, entitled "AUTOMATED TICKET SALES AND DISPENSING SYSTEM", to Wilder, filed Jul. 5, 1994; U.S. Pat. No. 5,504,675, entitled "METHOD AND APPARATUS FOR AUTOMATIC SELECTION AND PRESENTATION OF SALES PROMOTION PROGRAMS", to Cragun et al., filed Dec. 22, 1994; U.S. Pat. No. 5,450,938, entitled "CARD OR CASH ACTUATED VENDING MACHINE ASSEMBLY", to Rademacher, filed May 2, 1994; U.S. Pat. No. 4,982,346, entitled "MALL PROMOTION NETWORK APPARATUS AND METHOD", to Girouard et al., filed Dec. 16, 1988; and U.S. Pat. No. 4,947,028, entitled "AUTOMATED ORDER AND PAYMENT SYSTEM", to Gorog, filed Jul. 19, 1988. The list is being incorporated in its entirety by reference because one or more patents on the list show, for example, that the following functions are known to be done separately in the vending machine art: vending machine communication to serially-communicating devices such as a remote host or local handheld computer, e.g., to exchange sales/inventory data; interactive vending via a touch screen display panel on the vending machine; vending via voice recognition; display of information such as promotions and marketing messages; display of commercials stored in the vending machine; credit card vending; and customer surveying.

The present invention is directed toward a versatile multifunction vending machine controller (VMC). Such a VMC provides enhanced capabilities to new and existing (via retrofitting) vending machines. The inventive VMC not only enables enhanced two-way vender communication, but it can also meet advanced requirements envisioned by marketing group as likely to enhance consumer appeal and usability.

The vending machine controller (VMC) of the present invention has at least the following advantages. It achieves a performance equivalent to that of a controller using a programmable processor that has plural serial ports formed on the same chip as the processor without actually forming more than one such serial port on the same chip as the processor, i.e., without the cost of a custom integrated circuit. This is achieved by using the port arbitrator 234. With the port arbitrator 234, the single serial port of the programmable processor 201 can be connected to any of a plurality of serially communicating devices. The VMC is remotely reprogrammable and supports remote price changing. This VMC also supports multimedia presentations to the customer. Moreover, the telecommunication, vend operations, and multimedia presentations can be conducted concurrently because of the fast processing speed and multitasking ability of the programmable processor 201.

To reiterate, the VMC of the present invention supports: interactive (touch screen) vending which not only fascinates customers, but also enables consumer surveys at the machine; display of marketing messages, sports scores, etc., which can be transmitted to the machine via the same remote link used for collection of machine sales/inventory data; display of video commercials, stored within the machine on the disk device; credit card vending, including debit authorization; voice recognition for product selection; announcement and control of special promotions (e.g., buy five, get one free); remote price changing, to accommodate promotions such as "Soda in the Morning!"; single serial port arbitration to achieve virtual plural-serial-port performance; and remote reprogramming capability of controller via flash EEPROM.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vending-machine controller comprising:
   a programmable processor controlling operation of the vending machine;
   a first serial port connected to the programmable processor;
   an arbitrator operable in a hunt mode to monitor an input from each of at least two serially-communicating devices, respectively, to determine that a communication session is being initiated by one of the serially-communicating devices if activity is present upon an input, and to connect the first serial port of the programmable processor to the serially-communicating device that first initiates a communication session; and
   a second serial port configured as one of a multi-drop bus interface and a VCCS bus interface for connecting the programmable processor to a multi-drop bus or a VCCS bus, respectively.

2. The controller as in claim 1, further comprising:
   a general purpose interface connecting the programmable processor to a vended-product selection, man/vending-machine interaction-panel.

3. The controller as in claim 1, wherein:
   the programmable processor is a multitasking processor operating according to preemptive time-sharing.

4. The controller as in claim 1, further comprising:
   an ISA-type interface connecting the programmable processor to at least one circuit card.

5. The controller as in claim 1, wherein the first serially-communicating device adheres to a different communications protocol than the second serially communicating device.

6. The controller as in claim 1, wherein at least one of said at least two serially-communicating devices adheres to the DEX/UCS communication protocol.

7. The controller as in claim 6, wherein at least one of said at least two serially-communicating devices adheres to the DEX/UCS communication protocol.

8. The controller as in claim 5, further comprising:
   erasable non-volatile memory storing basic operational programs of the programmable processor;
   wherein the programmable processor is remotely reprogrammable by connection to a remote host such that the remote host can replace the contents of the erasable non-volatile memory.

9. The controller as in claim 1, wherein:
   the arbitrator includes a connection control register; and
   the programmable processor initializes the connection control register to a first predetermined value to select the hunt mode of the arbitrator.

10. The controller as in claim 9, wherein the programmable processor sets the connection control register to one of a second predetermined value and a third predetermined value to operate in fixed mode such that, if the programmable processor sets the connection control register to the second predetermined value then the arbitrator connects the first serial port of the programmable processor to a first one of said at least two serially-communicating devices, and if the programmable processor sets the connection control register to the third predetermined value then the arbitrator connects the first serial port of the programmable processor to a second one of said at least two serially-communicating devices.

11. The controller as in claim 1, wherein the first serial port and the programmable processor are formed on the same integrated circuit.

12. A vending-machine system comprising:
   at least two serially-communicating devices;
   a programmable processor controlling operation of the vending machine;
   a first serial port connected to the programmable processor;
   an arbitrator operable in a hunt mode to monitor an input from each of said at least two serially-communicating devices, respectively, to determine that a communication session is being initiated by one of the serially-communicating devices if activity is present upon an input, and to connect the first serial port of the programmable processor to the serially-communicating device that first initiates a communication session; and
   a second serial port configured as one of a multi-drop bus interface and a VCCS bus interface for connecting the programmable processor to a multi-drop bus or a VCCS bus, respectively.

13. The system as in claim 12, wherein a first one of said at least two serially-communicating devices adheres to a different communication standard than a second one of said at least two serially-communicating devices.

14. The system as in claim 13, wherein the first serially-communicating device is a handheld-type computer.

15. The system as in claim 13, wherein the second serially-communicating device is one of a modem, a touch-screen man-machine interface, and another programmable processor.

16. The system as in claim 13, wherein the first serially-communicating device adheres to different communication protocol than the second serially-communicating device.

17. The controller as in claim 12, wherein at least one of said at least two serially-communicating devices adheres to the DEX/UCS communication protocol.

18. The controller as in claim 17, wherein at least one of said at least two serially-communicating devices adheres to the DEX/UCS communication protocol.

19. The system as in claim 12, further comprising:
a general purpose interface connecting the programmable processor to a vended-product selection, man/vending-machine interaction-panel.

20. The system as in claim 19, wherein:
the vended-product selection, man/vending-machine interaction-panel includes a customer-actuatable product selection input device and a least one display device.

21. The system as in claim 20, wherein:
the customer-actuatable product selection input device includes a plurality of customer-actuatable product selection switches;
each customer-actuatable product selection switch includes a display device in the form of a product availability indicator; and
the vended-product selection, man/vending-machine interaction-panel includes an alphanumeric display device.

22. The controller as in claim 12, wherein:
the arbitrator includes a connection control register; and
the programmable processor initializes the connection control register to a first predetermined value to select the hunt mode of the arbitrator.

23. The controller as in claim 22, wherein the programmable processor sets the connection control register to one of a second predetermined value and a third predetermined value to operate in fixed mode such that, if the programmable processor sets the connection control register to the second predetermined value then the arbitrator connects the first serial port of the programmable processor to a first one of said at least two serially-communicating devices, and if the programmable processor sets the connection control register to the third predetermined value then the arbitrator connects the first serial port of the programmable processor to a second one of said at least two serially-communicating devices.

24. The controller as in claim 12, further comprising:
an ISA-type interface connecting the programmable processor to at least one circuit card.

25. The controller as in claim 24, further comprising:
a disk drive connected to the ISA-type interface;
an at least VGA-quality display connected to the ISA-type interface; and
a sound reproduction circuit for reproducing sound connected to the ISA interface;
wherein the controller uses the disk drive, the at least VGA-quality display, and the sound reproduction circuit to produce a multi-media presentation to a customer.

26. The controller as in claim 25, further comprising:
a full motion video reproduction circuit for reproducing full motion video images;
wherein the controller also uses the full motion video reproduction circuit to produce a full-motion-video-type multi-media presentation to a customer.

27. The controller as in claim 25, further comprising:
a touch screen type man/machine-interface connected to the ISA interface;
wherein the controller also uses the touch screen type man/machine-interface to produce a multi-media presentation to a customer.

28. The controller as in claim 12, wherein the first serial port and the programmable processor are formed on the same integrated circuit.

29. The controller as in claim 12, wherein:
the programmable processor is a multitasking processor operating according to preemptive time-sharing.

30. The controller as in claim 1, wherein said arbitrator includes:
a multiplexer to selectively connect one of said at least two serially-communicating devices to said first serial port of said programmable processor; and
logic to sense activity by each of said at least two serially-communicating devices and to control said multiplexer to connect the serially-communicating device for which activity is first sensed to said first serial port.

31. The controller as in claim 30, wherein said logic includes:
a first activity-recognizing unit to sense activity by a first one of said at least two serially-communicating devices and to control said multiplexer to connect said first one to said first serial port upon the sensing of activity by said first one; and
a second activity-recognizing unit to sense activity a second one of said at least two serially-communicating devices and to control said multiplexer to connect said second one to said first serial port upon the sensing of activity by said second one.

32. The system as in claim 12, wherein said arbitrator includes:
a multiplexer to selectively connect one of said at least two serially-communicating devices to said first serial port of said programmable processor; and
logic to sense activity by each of said at least two serially-communicating devices and to control said multiplexer to connect the serially-communicating device for which activity is first sensed to said first serial port.

33. The system as in claim 32, wherein said logic includes:
a first activity-recognizing unit to sense activity by a first one of said at least two serially-communicating devices and to control said multiplexer to connect said first one to said first serial port upon the sensing of activity by said first one; and
a second activity-recognizing unit to sense activity a second one of said at least two serially-communicating devices and to control said multiplexer to connect said second one to said first serial port upon the sensing of activity by said second one.

* * * * *